(12) United States Patent
Andersen

(10) Patent No.: US 11,640,011 B1
(45) Date of Patent: May 2, 2023

(54) SACRIFICIAL ANODE OPTICAL MONITORY SYSTEM

(71) Applicant: L3Harris Technologies, Inc., Melbourne, FL (US)

(72) Inventor: Jesper Andersen, Bel Air, MD (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 17/497,134

(22) Filed: Oct. 8, 2021

(51) Int. Cl.
*G01V 8/12* (2006.01)
*G01V 8/14* (2006.01)

(52) U.S. Cl.
CPC . *G01V 8/12* (2013.01); *G01V 8/14* (2013.01)

(58) Field of Classification Search
CPC .............. G02B 21/06; G02B 21/362; G06K 19/06046; G06K 19/07749; G01V 8/12; G01V 8/14
See application file for complete search history.

(56) References Cited

U.S. PATENT DOCUMENTS

| | | | | |
|---|---|---|---|---|
| 5,947,369 A | * | 9/1999 | Frommer | G06K 19/06046 235/382 |
| 2016/0222714 A1 | * | 8/2016 | Rai | G01V 8/14 |
| 2017/0191171 A1 | * | 7/2017 | Aljabri | G01R 33/032 |
| 2019/0149158 A1 | * | 5/2019 | Watanabe | G04F 5/145 331/94.1 |
| 2019/0381203 A1 | * | 12/2019 | Zaborsky | A61L 2/10 |
| 2021/0148832 A1 | | 5/2021 | Kvryan et al. | |
| 2021/0239675 A1 | | 8/2021 | Teepe et al. | |
| 2022/0102018 A1 | * | 3/2022 | Embry | G01S 17/88 |

FOREIGN PATENT DOCUMENTS

| EP | 3796052 A1 * | 3/2021 | G01V 8/12 |
|---|---|---|---|
| WO | WO-2020128295 A1 * | 6/2020 | G01N 21/9081 |

* cited by examiner

*Primary Examiner* — Jennifer D Bennett
*Assistant Examiner* — Erin R Garber
(74) *Attorney, Agent, or Firm* — Edell, Shapiro & Finnan, LLC

(57) ABSTRACT

A system for remotely monitoring a depletion state of a sacrificial anode. The system includes a light emitter that is configured to emit a light beam and an optical receiver positioned to receive the light beam. A sacrificial anode is located between the light emitter and the optical receiver in a pathway of the light beam, the sacrificial anode being electrically coupled to a metallic structure for the purpose of minimizing corrosion of the metallic structure. Absent a presence of the sacrificial anode in the pathway of the light beam, the optical receiver is configured to receive the light beam, and in response to receiving the light beam, to generate an electrical signal indicative of the depletion state of the sacrificial anode.

20 Claims, 15 Drawing Sheets

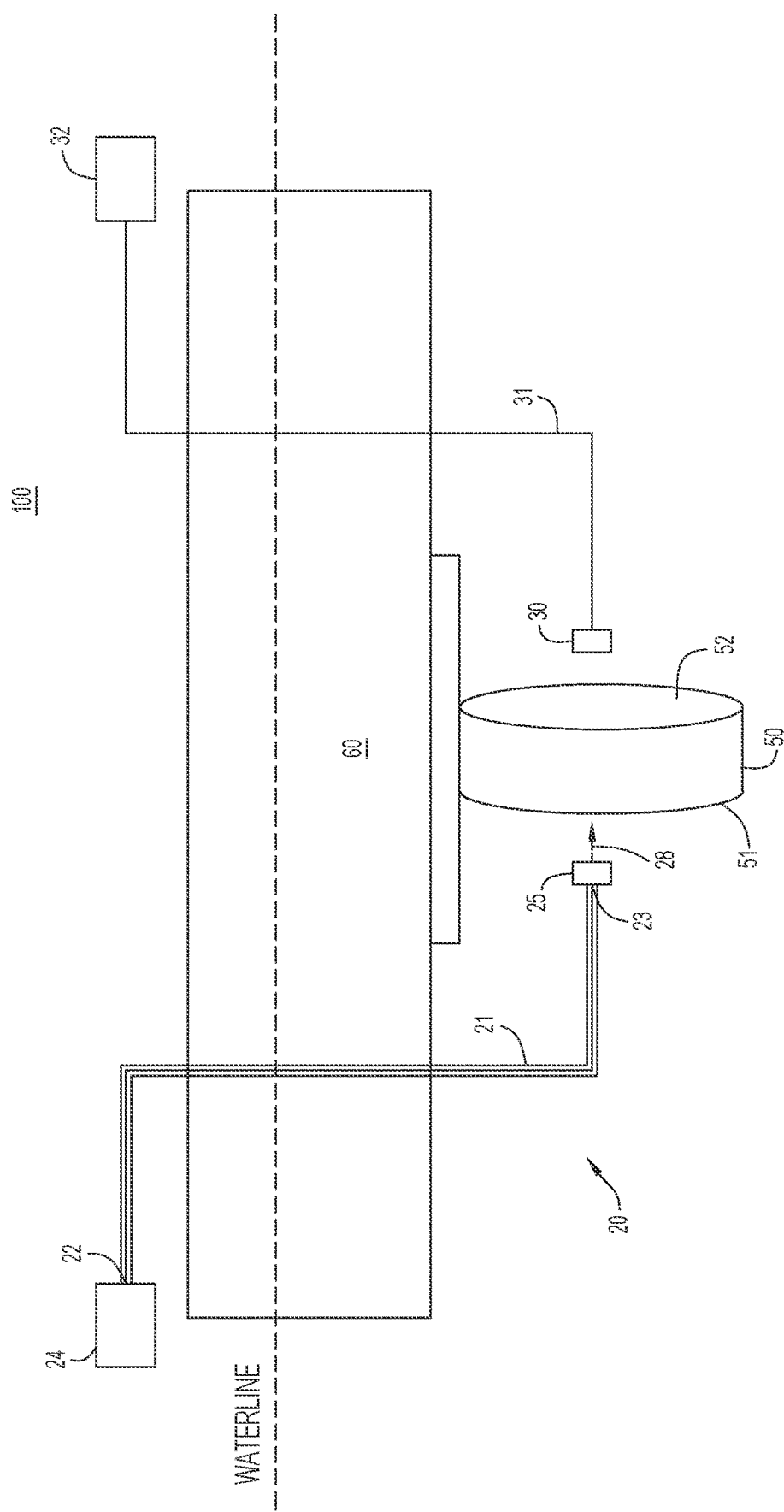

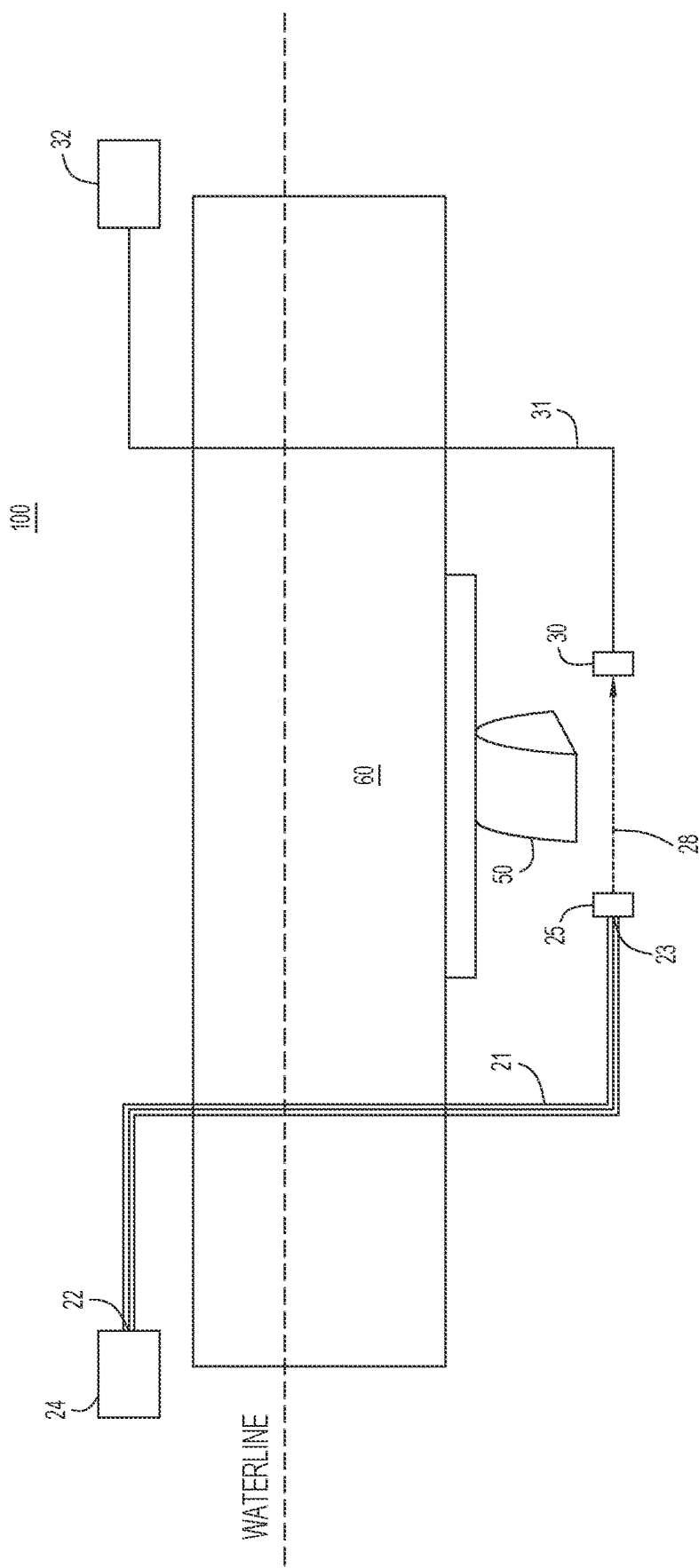

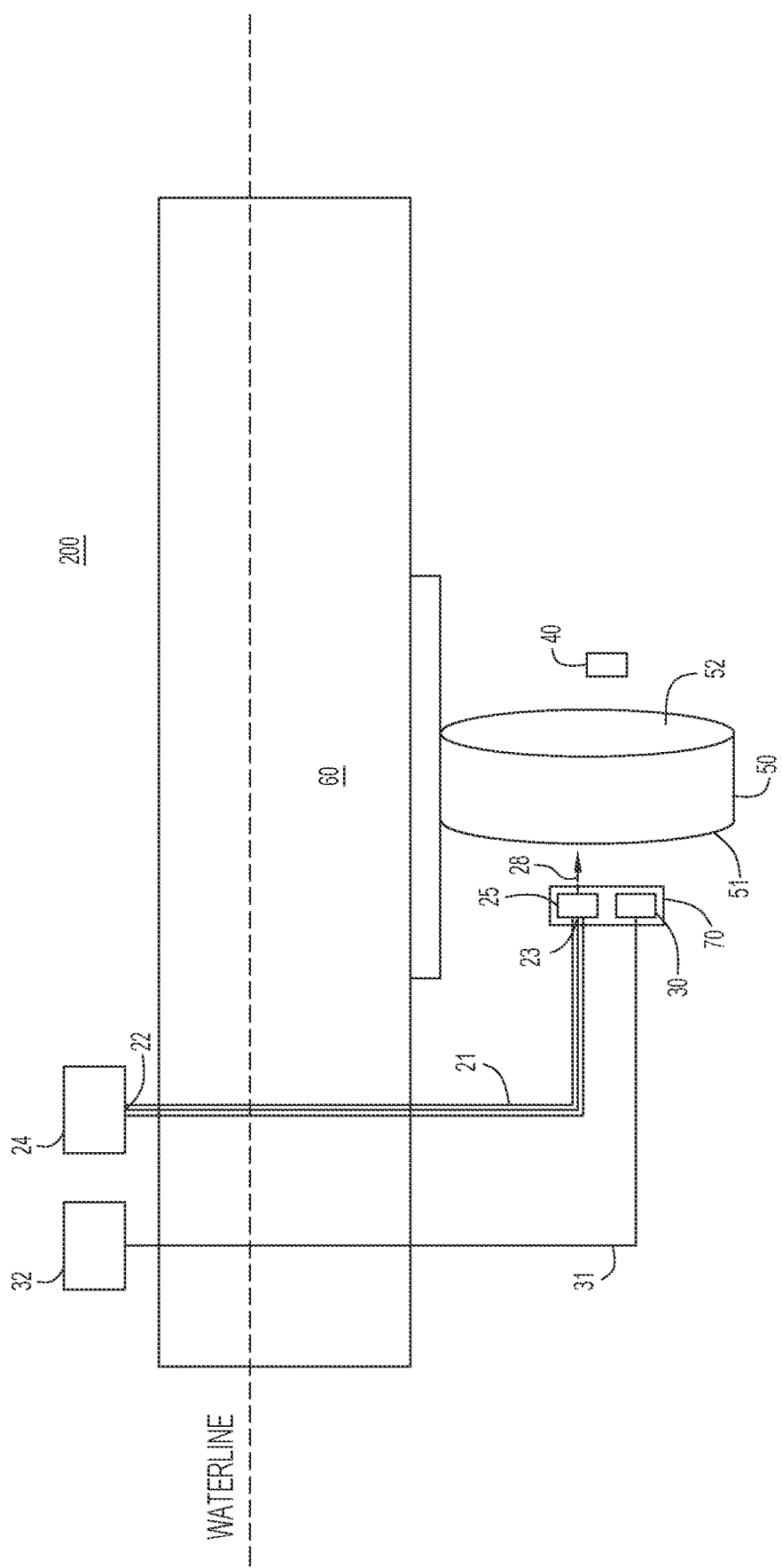

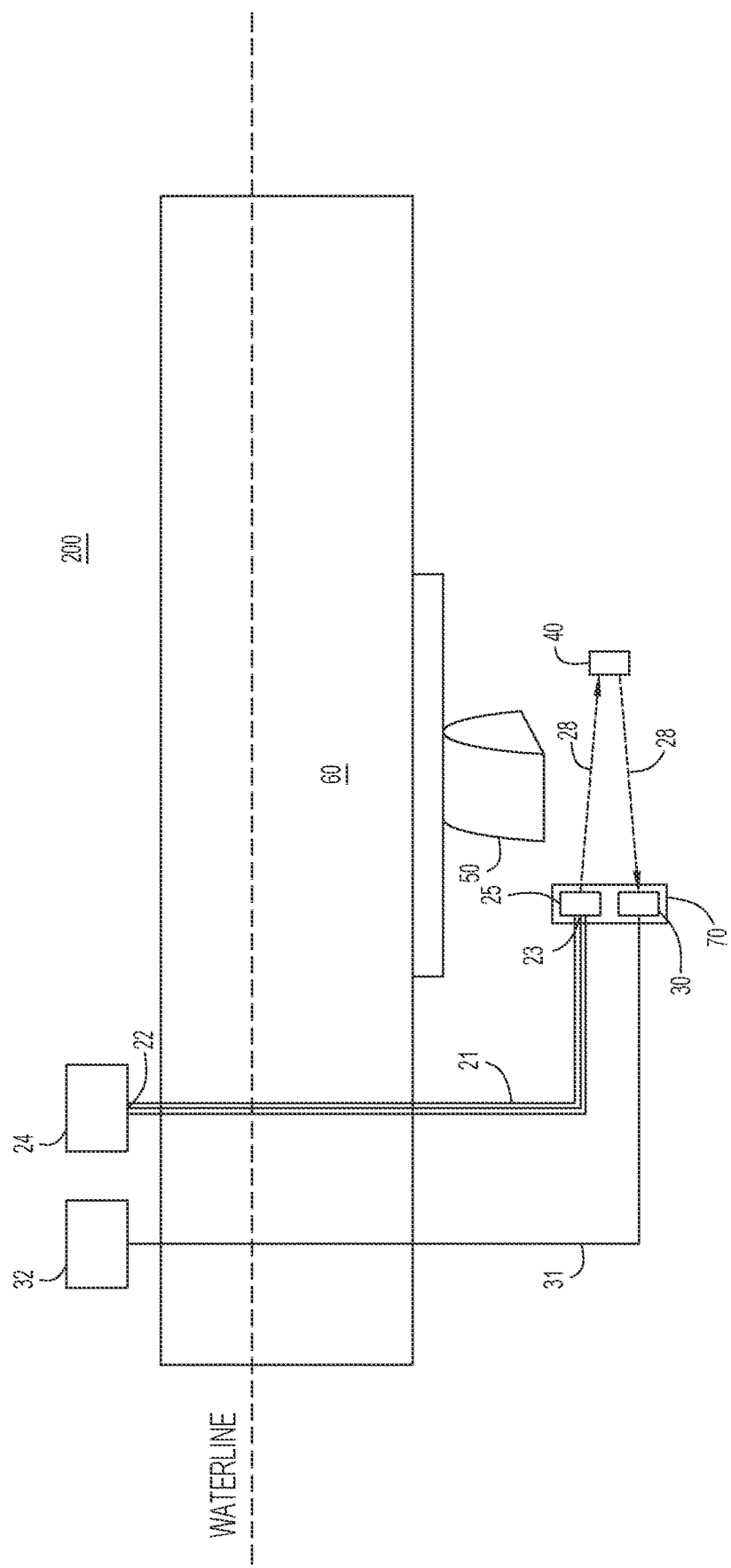

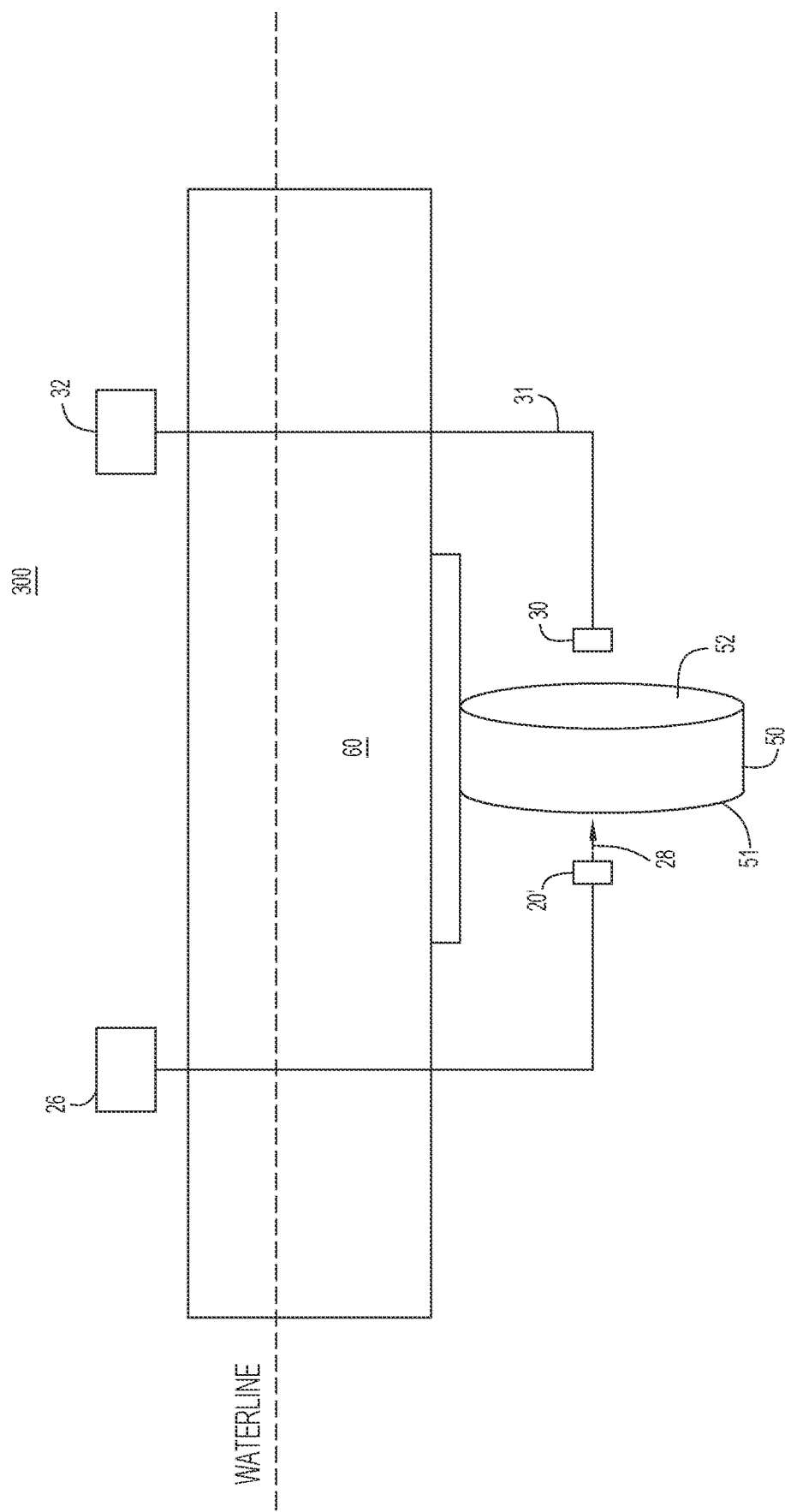

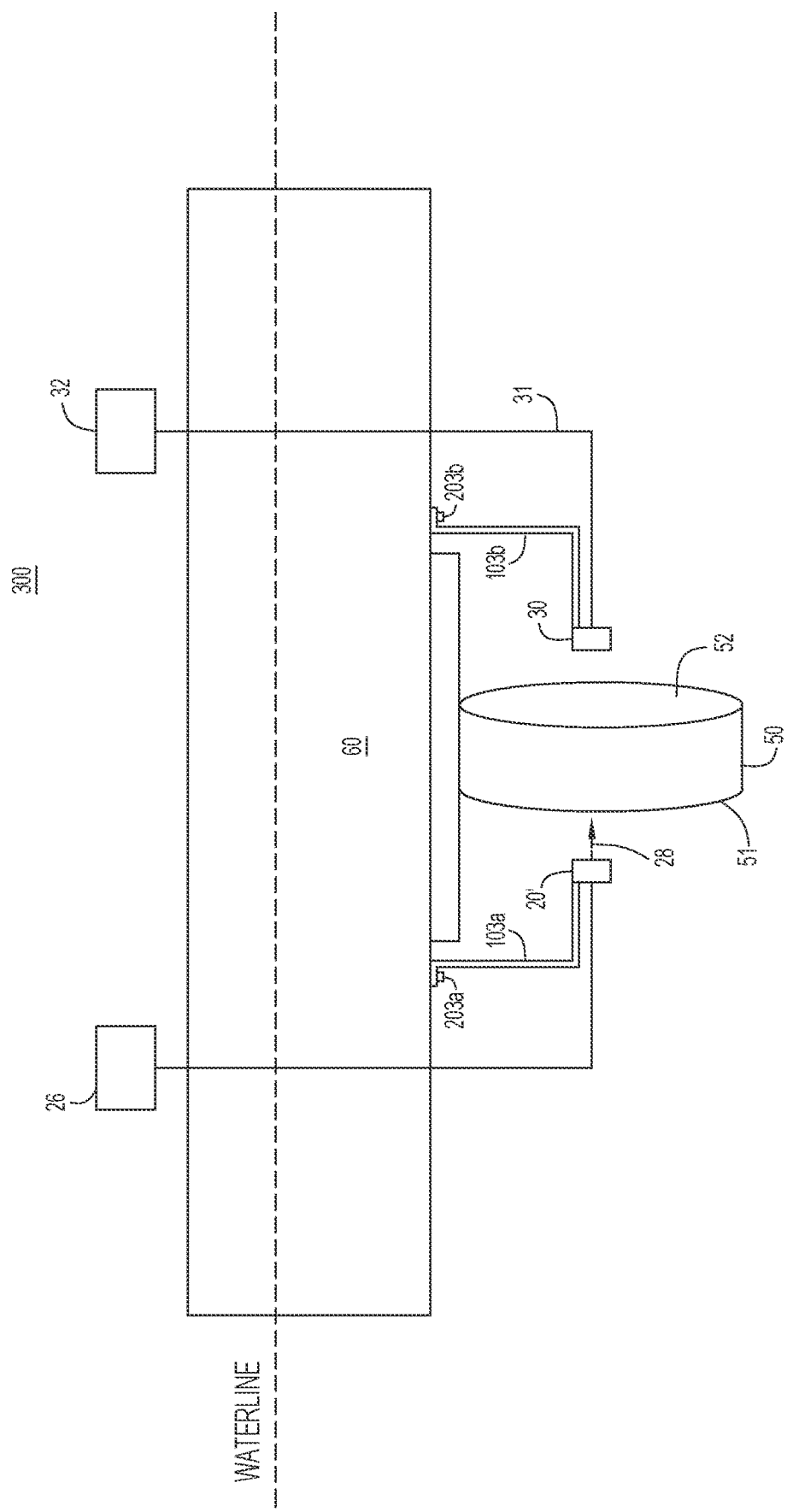

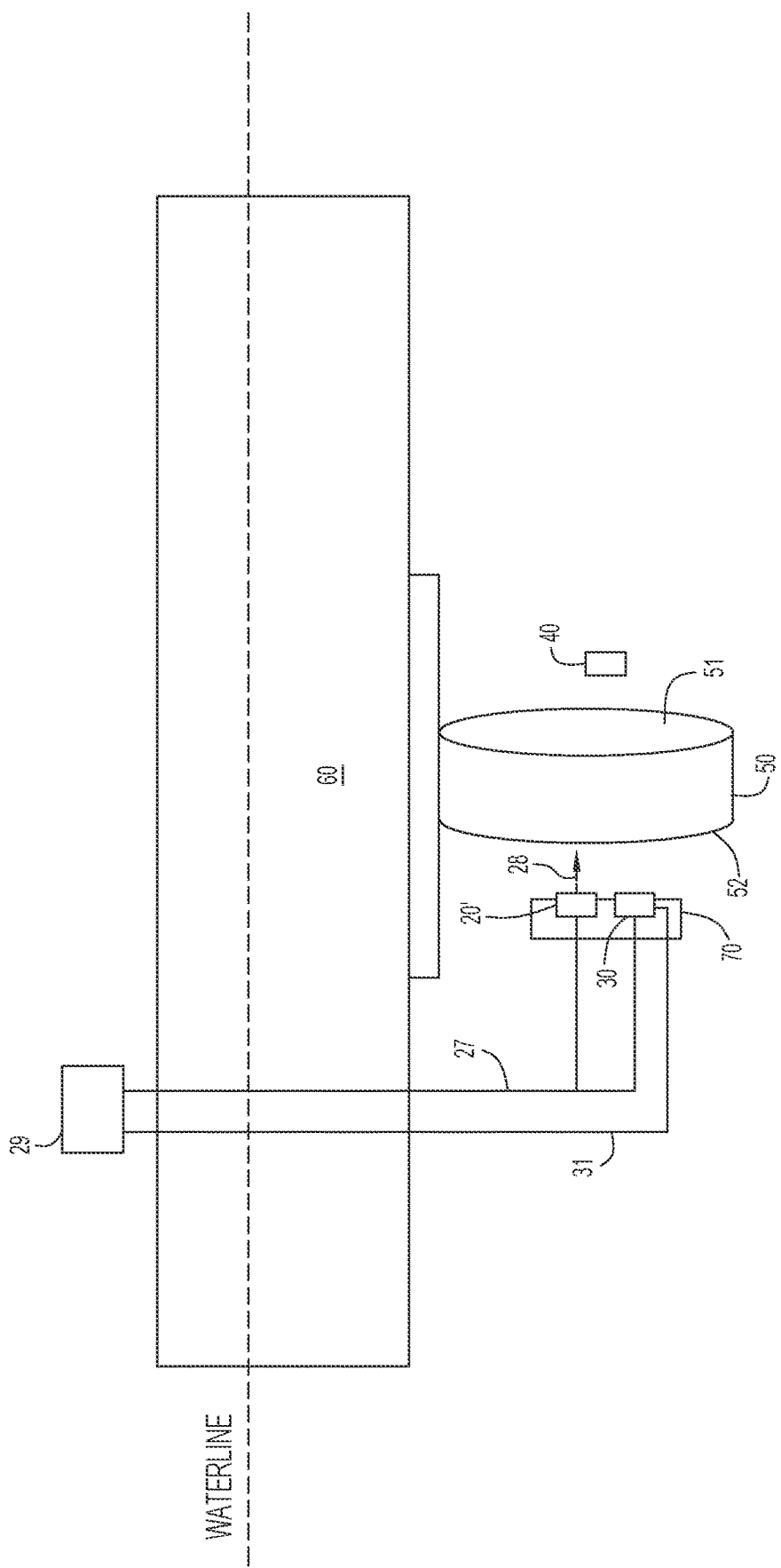

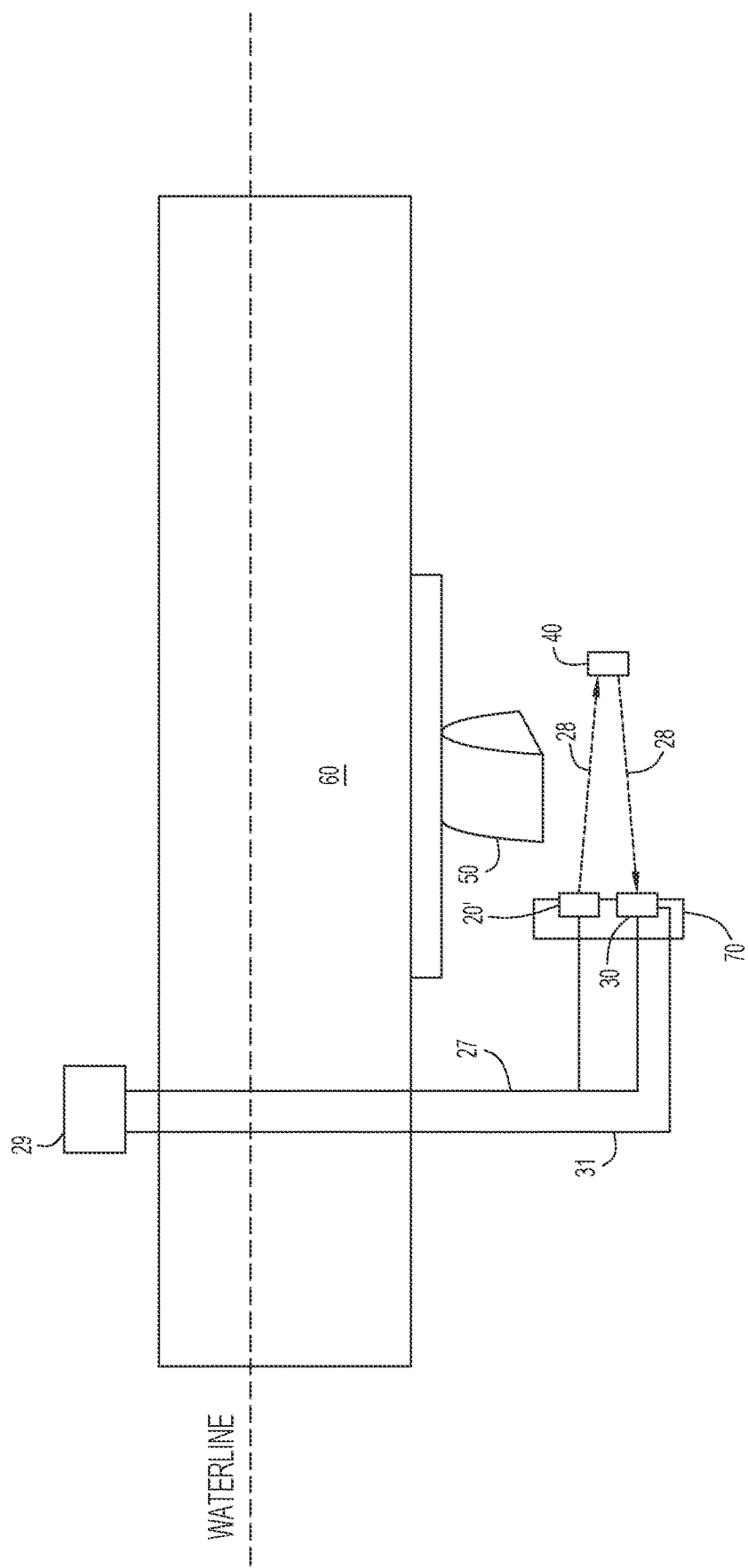

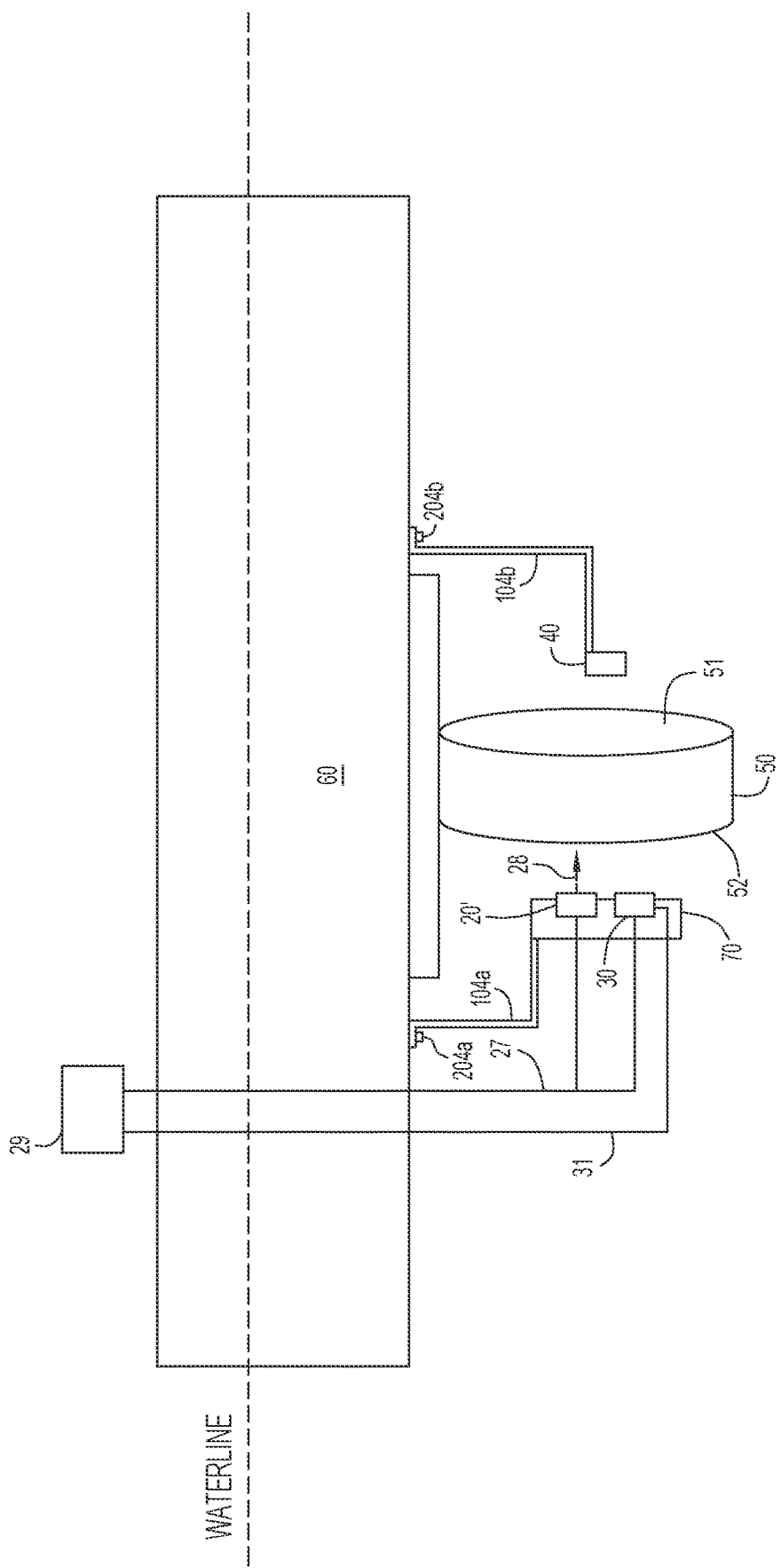

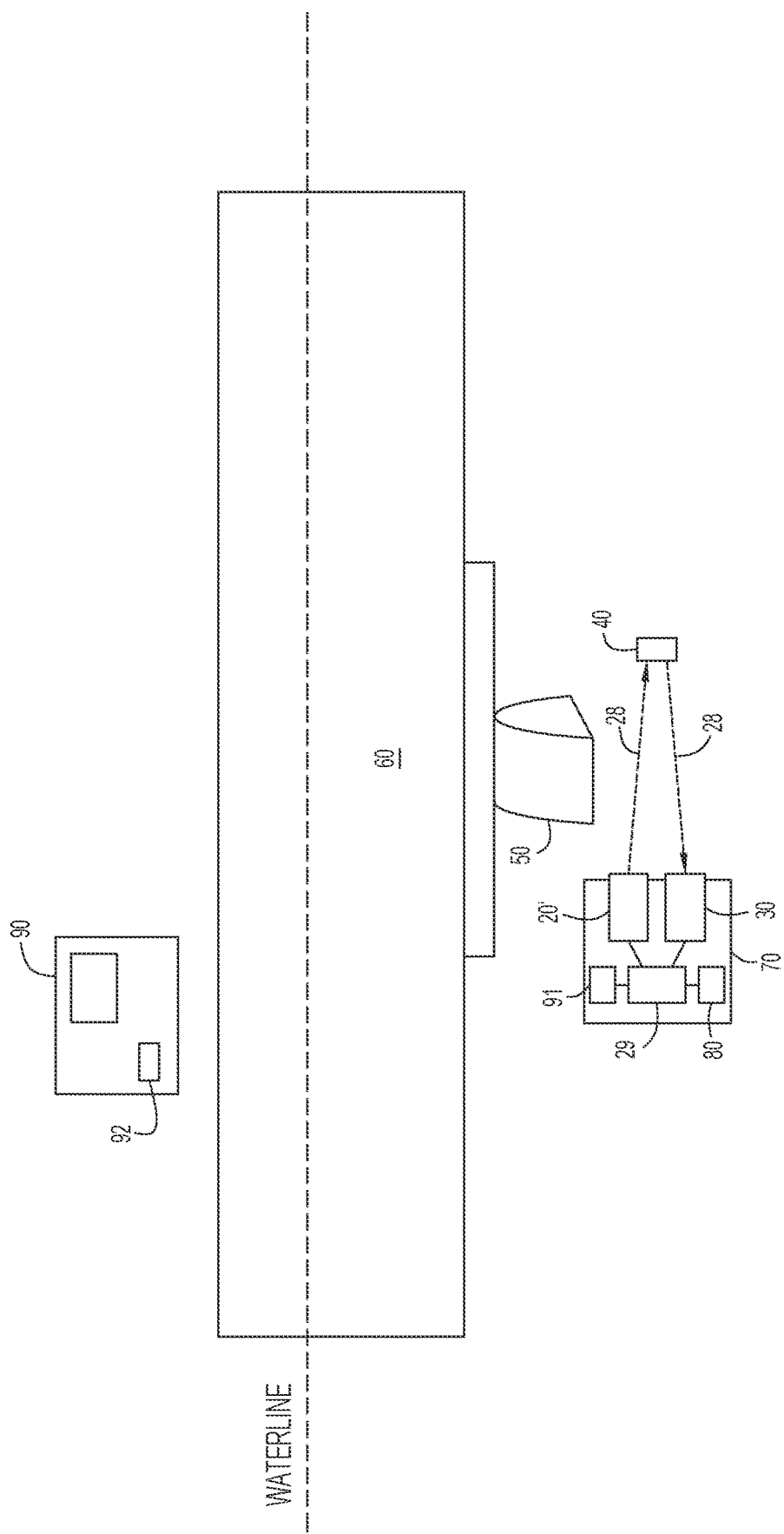

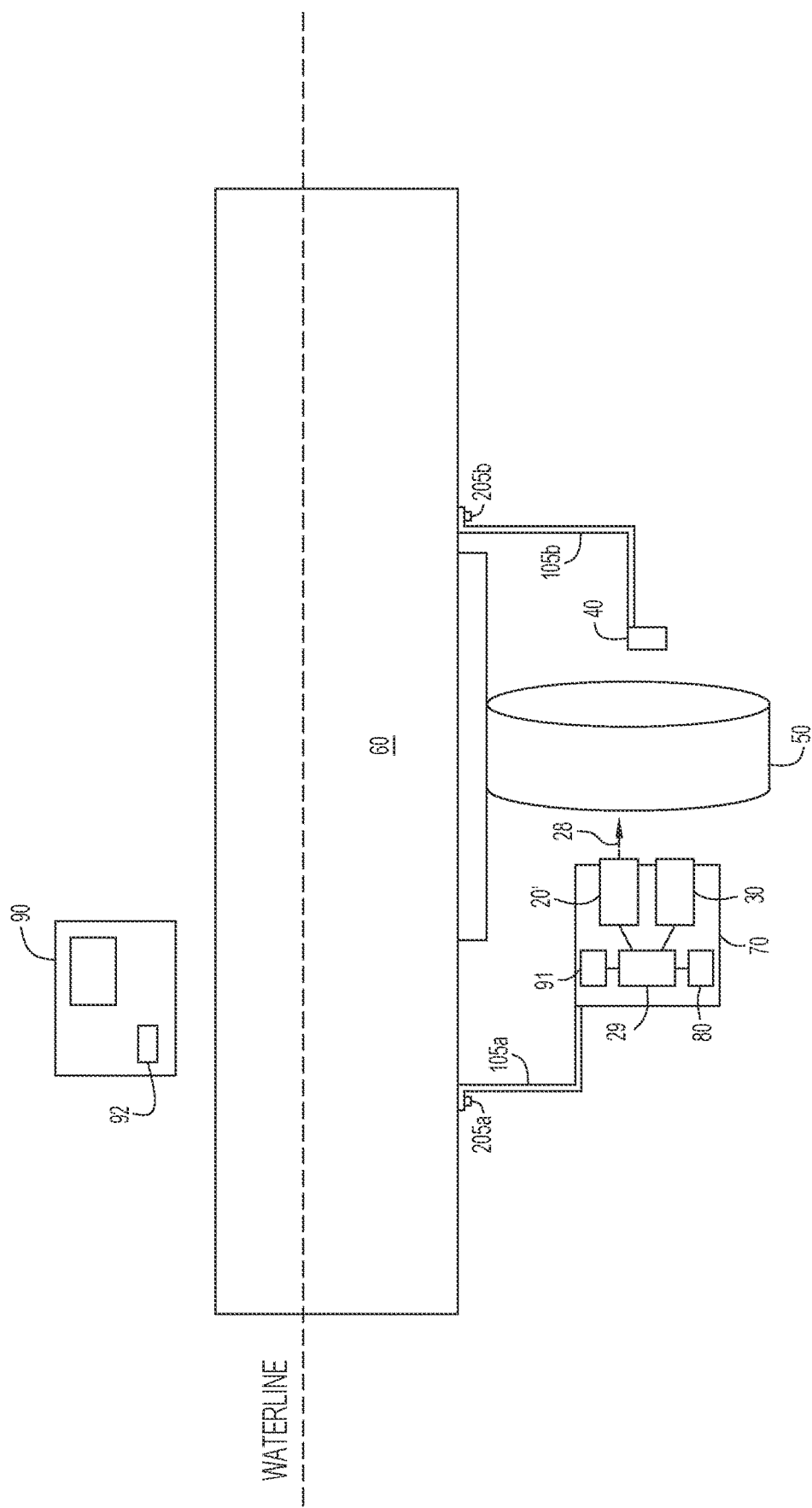

SACRIFICIAL ANODE OPTICAL MONITORY SYSTEM

TECHNICAL FIELD

The present invention relates to monitoring a depletion state of a sacrificial anode, and more particularly, to remotely monitor the depletion state of a sacrificial anode using an optical based system.

BACKGROUND

Sacrificial anodes are used to protect submerged structures from corrosion. They are made from a metal alloy with a more "active" voltage (more negative reduction potential/ more positive electrochemical potential) than the metal of the structure. The difference in potential between the two metals means that the sacrificial anode (e.g. galvanic anode) corrodes, so that the anode material is consumed in preference to the structure.

Because the function of sacrificial anodes necessarily requires that they be consumed, when the anode reaches a certain state of depletion their effectiveness is diminished to a point at which they need to be replaced. Because sacrificial anodes are typically used in underwater environments, a diver or remote underwater vehicle is used to visually assess its state. The other option is to bring the structure (e.g. a hull of a ship) to which the anode is attached to a location above the surface of the body of water so that the anode may be visually inspected. Each of these inspection options is costly and limits the frequency at which inspections can be made.

SUMMARY

Disclosed is a sacrificial anode optical monitoring system that is used to remotely monitor the depletion state of the anode located in a body of water or other liquid. According to one implementation the system includes a light emitter that is configured to emit a light beam and an optical receiver positioned to receive the light beam. A sacrificial anode is located between the light emitter and the optical receiver in a pathway of the light beam, the sacrificial anode being electrically coupled to a metallic structure for the purpose of minimizing rusting of the metallic structure. Absent a presence of the sacrificial anode in the pathway of the light beam, the optical receiver is configured to receive the light beam, and in response to receiving the light beam, to generate an electrical signal indicative of the depletion state of the sacrificial anode.

According to some implementations, the light emitter and optical receiver are located on opposite sides of the sacrificial anode and are arranged with respect to one another such that the light beam is directed onto the optical receiver absent the presence of the sacrificial anode between them.

According to another implementation, each of the light emitter and optical receiver is located on a first side of the sacrificial anode and there exists on a second side of the sacrificial anode a light reflector that is configured to reflect the light beam emitted by the light emitter onto the optical receiver. According to one such implementation, the light emitter and optical receiver are located in a common watertight housing. According to one implementation the watertight housing further includes inside it a battery that is electrically coupled to and configured to power the light emitter and the optical receiver. According to one implementation the system further includes a control circuit located inside the leak-tight housing that is configured to cause the light emitter to intermittently emit the first beam of light for the purpose of conserving battery power. According to one such implementation, to further conserve battery power, the control circuit is configured to cause the optical receiver to be powered by the battery only during a time when the first light beam is being emitted by the light emitter.

In yet another implementation, the system further includes a transmitter located inside the leak-tight housing that electronically communicates the optical receiver with a remote indicator, or a control unit associated with the remote indicator. The remote indicator may be, for example. a sound or light indicator. The transmitter may be configured communicate with the remote indicator (or its associated control unit) via a wired or wireless transmission.

In regard to the system described in paragraph [0004] above, the light emitter may comprise a waveguide or light pipe having a first end optically coupled to a light source and a second end opposite the first end that is configured to direct the light beam out of the waveguide. According to one such implementation, the light source may be located inside the structure that is being protected by the sacrificial anode and the second end of the waveguide is located external to the structure, facing a side of the sacrificial anode. According to some implementations the waveguide comprises an end emitting fiber optic cable.

According to some implementations the light emitter, the optical receiver and the sacrificial anode are arranged with respect to one another such that upon the electrical signal being generated in the optical receiver the depletion state of the sacrificial anode is between 50% and 90%. According to some implementations, the depletion state of the sacrificial anode is at least 70% or greater when the electrical signal is generated.

An advantage of the monitoring systems disclosed and contemplated herein is that they obviate the need to send divers or remotely operated vehicles into a body of water to survey the depletion state of a sacrificial anode. Nor is there a need to remove the structure to which the sacrificial anode is attached outside the body of water to gain access to the sacrificial anode.

These and other advantages and features will become apparent in view of the drawings and the description detailed description.

BRIEF DESCRIPTION OF THE DRAWINGS

FIGS. 1A, 1B and 1C are schematic representations of a system for remotely monitoring a depletion state of a sacrificial anode according to one implementation.

FIGS. 2A, 2B and 2C are schematic representations of a system for remotely monitoring a depletion state of a sacrificial anode according to another implementation.

FIGS. 3A, 3B and 3C are schematic representations of a system for remotely monitoring a depletion state of a sacrificial anode according yet another implementation.

FIGS. 4A, 4B and 4C are schematic representations of a system for remotely monitoring a depletion state of a sacrificial anode according to another implementation.

FIGS. 5A, 5B and 5C are schematic representations of a system for remotely monitoring a depletion state of a sacrificial anode according to another implementation.

DETAILED DESCRIPTION

As noted above, this disclosure relates to monitoring a depletion state of a sacrificial anode that is electrically coupled to a metallic structure that is intended to be protected by the sacrificial anode. In the examples that follow, for discussion purposes, the metallic structure is represented as a hull of a ship. It is appreciated however, that the scope of the disclosure is not limited to these examples and that the metallic structure may be any of a variety of dynamic or static metallic structures located in a body of water or any other liquid.

Further, the depletion state of a sacrificial anode as disclosed herein is determined by whether or not a light beam is successfully transmitted across a space that was originally occupied by the sacrificial anode. In some instances, a successful transmission of the light beam is indicative that the sacrificial anode has eroded to a point that requires its replacement or otherwise warrants some type of inspection (e.g. visual inspection) to determine whether or not the sacrificial anode in fact needs to be replaced. In some instances, the light emitter, optical receiver and sacrificial anode are arranged with respect to one another such that when a successful transmission of the light beam occurs, a determination of the amount of erosion can be estimated, determined or predicted. That is, a successful transmission of the light beam may indicate that at least a certain percentage of the sacrificial anode has eroded.

Figure 1C:
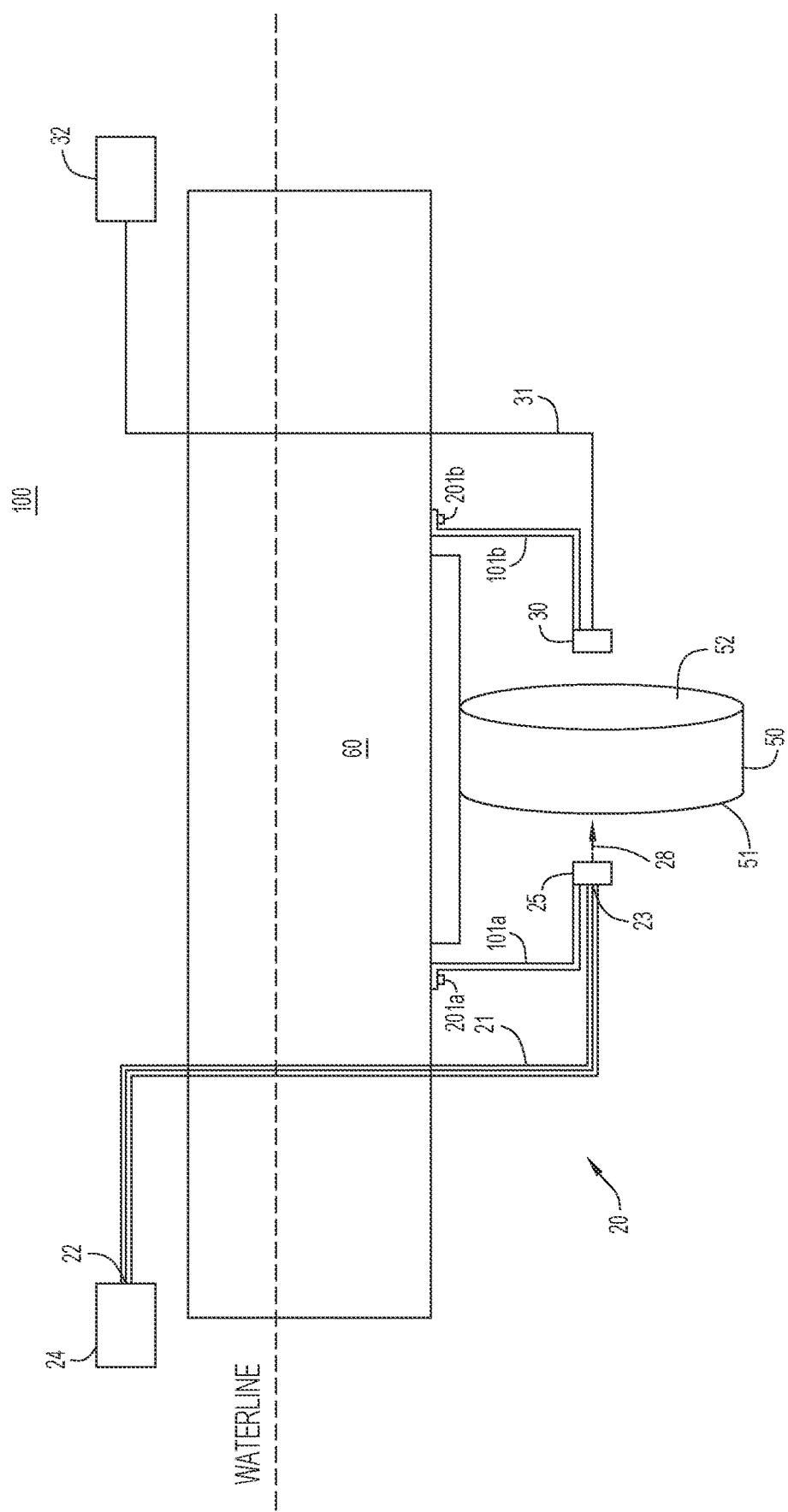

FIGS. 1A and 1B are schematic representations of a system 100 for remotely monitoring a depletion state of a sacrificial anode according to one implementation. The system 100 includes a sacrificial anode 50 located in a space between a light emitter 20 and an optical receiver 30. The sacrificial anode 50 is electrically coupled to a metallic structure 60 that may be, for example, the hull of a ship. The light emitter 20 includes a waveguide 21 having a proximal end 22 and a distal end 23, the proximal end 22 being optically coupled to a light source 24 that produces a light beam 28. In the example shown, the light source 24 is located inside the ship. According to one implementation the waveguide 20 is an end emitting fiber optic cable and is configured to direct the light beam 28 generated by the light source 24 to and through its distal end 23. In some implementations a lens 25 is positioned at the distal end 23 of the waveguide 21 to focus/intensify the light beam 28 as it leaves the waveguide. The lens 25 may be, for example, a collimating lens.

According to one implementation the light source 24 is a laser diode that emits red light. According to another implementation the light source 24 is configured to emit a second beam that is capable of ablating or otherwise removing unwanted deposits at the output end of the light emitter 20.

In the implementation of FIGS. 1A and 1B, the distal end 23 of the waveguide 21 is located on a first side 51 of the sacrificial anode 50, and the optical receiver 30 is located on a second side 52 of the sacrificial anode 50. The optical receiver 30 is optically aligned with the second end of the waveguide 23 and is configured to receive the light beam 28 as shown in FIG. 1B, absent the presence of the sacrificial anode 50 in the space located between the second end 23 of the waveguide 21 and the optical receiver 30. In response to receiving the light beam 28, the optical receiver 30 is configured to produce an electrical signal that is transmissible via a wired connection 31 to a control unit 32 located inside the ship that controls an activation of an alarm or other warning means (e.g. light and/or sound indicator).

As shown in FIG. 1A, up until a sufficient amount of erosion of the sacrificial anode occurs, the anode blocks transmission of the light beam 28 to the optical receiver 30. According to some or all of the implementations disclosed herein, upon there being a reception of the light beam 28 on or in the optical receiver 30 (like that shown in FIG. 1B), it is determinable that significant erosion of the sacrificial anode has occurred. As used herein "significant erosion" means that at least 50%, or at least 60%, or at least 70% or at least 80% or at least 90% of the original volume or mass of the sacrificial anode has eroded.

According to some implementations the distal end 23 of the waveguide 21 and the optical receiver 30 are supported by respective first and second brackets 101a and 101b or by a common bracket that is attached to the hull of the ship. The brackets and the means 201a and 201b by which they are attached to the hull are preferably made of corrosion resistant materials. The distal end 23 of the waveguide 21 and the optical receiver 30 are preferable attached to a common bracket that can more determinately maintain the components in proper optical alignment.

Figure 2C:
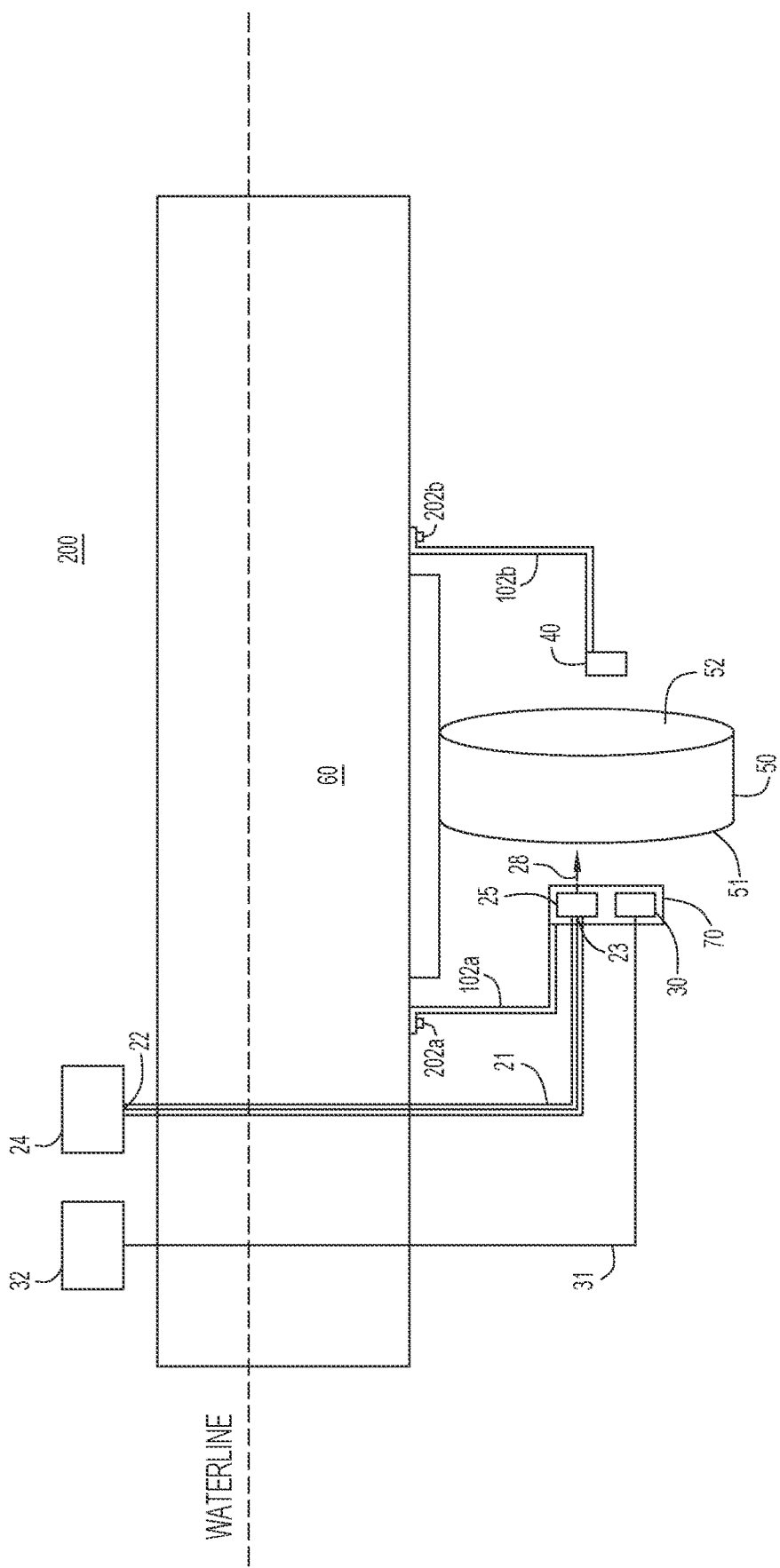

FIGS. 2A and 2B are schematic representations of a system 200 for remotely monitoring a depletion state of a sacrificial anode according to another implementation. Like system 100 discussed above, system 200 includes a light emitter 20 that is configured to produce and direct a light beam 28 towards the first side 51 of the sacrificial anode 50. Unlike system 100, the optical receiver 30 of system 200 is also located on the first side 51 of the sacrificial anode 50. Although not required, this enables the light emitting end of the light emitter 20 and the optical receiver 30 to be housed in a common housing 70. To facilitate optical communication between the light emitter 20 and the optical receiver 30, an optical reflector 40 is located on the second side 52 of the sacrificial anode 50. The optical reflector 40 is positioned and angularly oriented to receive the light beam 28 from the light emitter 20 and to reflect the light beam onto the optical receiver 30 as shown in FIG. 2B when that portion of the sacrificial anode 50 located in the intended optical pathway of the light beam has eroded.

The light emitting end of the light emitter 20, optical receiver 30, optical reflector 40 and sacrificial anode 50 are arranged with respect to one another such that when a successful transmission of the light beam 28 onto the optical receiver 30 occurs, a determination of the amount of erosion can be at least estimated, determined or predicted. That is, a successful transmission of the light beam across the sacrificial anode indicates that a certain percentage of the sacrificial anode has eroded.

According to some implementations the distal end 23 of the waveguide 21 and the optical receiver 30 are commonly supported by a first bracket 102a and the optical reflector 40 is supported by a second bracket 102b, the first and second brackets being coupled to the hull 60 of the ship. According to another implementation, the distal end 23 of the waveguide 21, the optical receiver 30 and the optical reflector 40 are attached to a common bracket that can more determinately maintain the components in proper optical alignment. The brackets and the means 202a and 202b by which they are attached to the hull are preferably made of corrosion resistant materials.

Figure 3B:
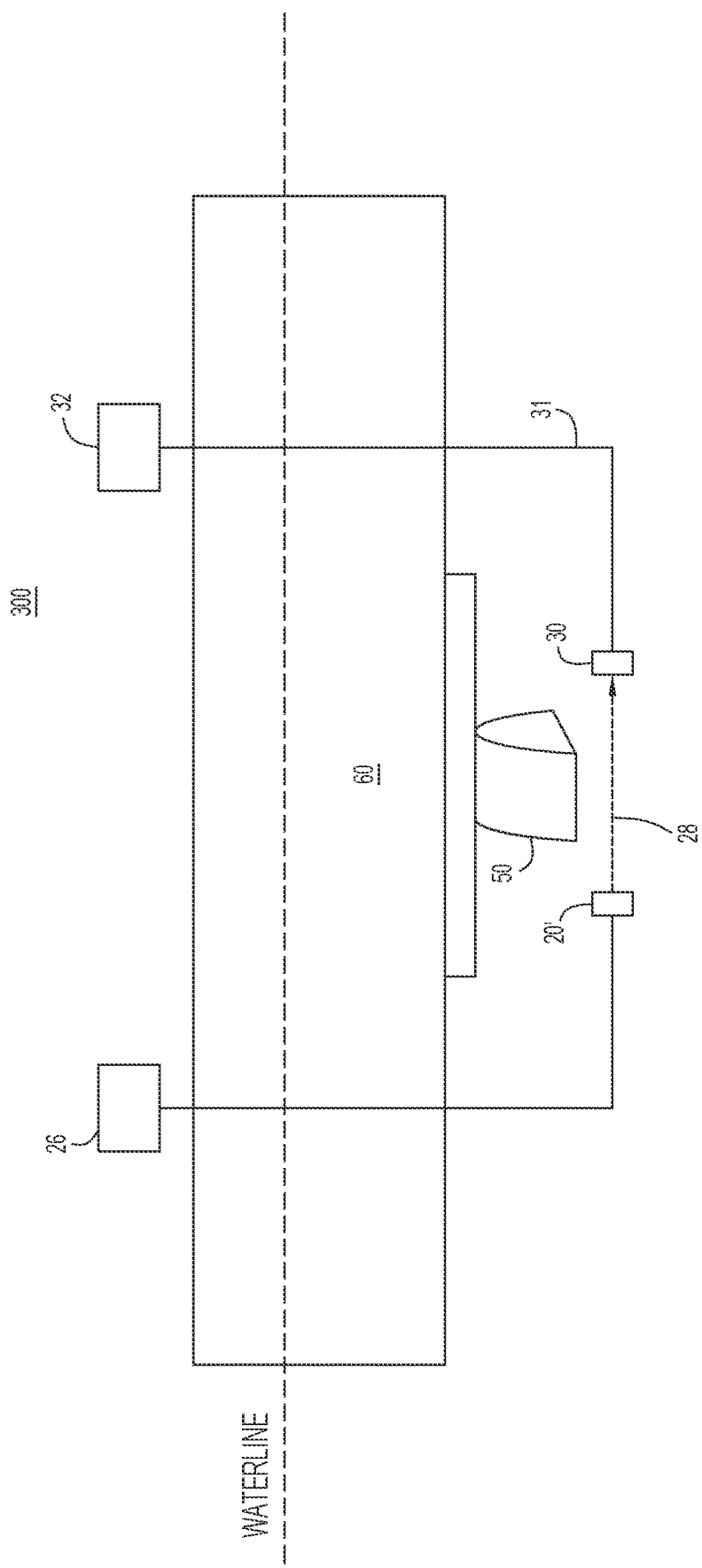

FIGS. 3A and 3B are schematic representations of a system 300 for remotely monitoring a depletion state of a sacrificial anode according to another implementation. Unlike systems 100 and 200 discussed above, system 300 does not utilize a waveguide to propagate a light beam. Instead, system 300 utilizes a light emitter 20' comprising, for example, a laser diode that is configured to be positioned directly adjacent the sacrificial anode 50. That is, the light source itself is configured to be located adjacent the sacrificial anode 50 and not inside the ship. The light emitter 20' may comprise other components, such as one or more lenses, to produce a suitable light beam at the outlet of the emitter. Coupled to the light emitter 20' is a control unit 26 that is configured to turn on and turn off the light emitter 20'. The control unit 26 may be under the control of a user that determines when to turn on and to turn off the light emitter 20'. Alternatively, the control unit 26 may be programmed to automatically and intermittently control the turning on and turning off of the light emitter 20'. In either case, operation of the optical receiver 30 may be controlled in conjunction with the turning on and turning off of the light emitter 20' such that the optical receiver is respectively turned on and off with the light emitter 20'. According to other implementations, the light emitter 20' and optical receiver 30 may be continuously activated.

As shown in FIGS. 3A and 3B, light emitter 20' and optical receiver 30 are respectively located on a first side 51 and on a second sides 52 of the sacrificial anode 50. The optical receiver 30 is optically aligned with the output of the light emitter 20' and is configured to receive the light beam 28 as shown in FIG. 3B, absent the presence of the sacrificial anode 50 in the space located between the light emitter 20' and the optical receiver 30. In response to receiving the light beam 28, the optical receiver 30 is configured to produce an electrical signal that is transmissible via a wired connection 31 to a control unit 32 located inside the ship that controls an activation of an alarm or other warning means (e.g. light and/or sound indicator).

As shown in FIG. 3A, up until a sufficient amount of erosion of the sacrificial anode occurs, the anode blocks transmission of the light beam 28 to the optical receiver 30.

According to some or all of the implementations disclosed herein, upon there being a reception of the light beam 28 on or in the optical receiver 30 (like that shown in FIG. 3B), it is determinable that significant erosion of the sacrificial anode has occurred. Significant erosion meaning that at least 50 percent of the original volume of the sacrificial anode has eroded.

According to some implementations the light emitter 20' and the optical receiver 30 are respectively supported by first and second brackets 103a and 103b that are coupled to the hull 60 of the ship. According to another implementation, the light emitter 20' and the optical receiver 30 are attached to a common bracket that can more determinately maintain the components in proper optical alignment. The brackets and the means 203a and 203b by which they are attached to the hull are preferably made of corrosion resistant materials.

FIGS. 4A and 4B are schematic representations of a system 400 for remotely monitoring a depletion state of a sacrificial anode according to another implementation. Like system 300 discussed above, system 400 includes a light emitter 20' that is configured to produce and direct a light beam 28 towards the first side 51 of the sacrificial anode 50. Unlike system 300, the optical receiver 30 of system 400 is also located on the first side 51 of the sacrificial anode 50. Although not required, this enables the light emitting end of the light emitter 20 and the optical receiver 30 to be housed in a common housing 70. To facilitate optical communication between the light emitter 20' and the optical receiver 30, an optical reflector 40 is located on the second side 52 of the sacrificial anode 50. The optical reflector 40 is positioned and angularly oriented to receive the light beam 28 from the light emitter 20' and to reflect the light beam onto the optical receiver 30 as shown in FIG. 4B when that portion of the sacrificial anode 50 located in the intended optical pathway of the light beam has eroded.

The light emitting end of the light emitter 20', optical receiver 30, optical reflector 40 and sacrificial anode 50 are arranged with respect to one another such that when a successful transmission of the light beam 28 into or onto the optical receiver 30 occurs, a determination of the amount of erosion can be at least estimated, determined or predicted. That is, a successful transmission of the light beam across the sacrificial anode indicates that a certain percentage of the sacrificial anode has eroded.

In the example of FIGS. 4A and 4B, the light emitter 20' and optical receiver 30 are controlled by a common control unit 29 that directly or indirectly delivers, or causes to be delivered, power to each of the light emitter 20' and optical receiver 30 through an electrically conductive wire 27. In response to receiving the light beam 28, the optical receiver 30 is configured to produce an electrical signal that is transmissible via wired connection 31 to the control unit 29 located inside the ship which also controls an activation of an alarm or other warning means (e.g. light and/or sound indicator).

According to some implementations the light emitter 20' and the optical receiver 30 are commonly supported by a first bracket 104a and the optical reflector 40 is supported by a second bracket 104b, the first and second brackets being coupled to the hull 60 of the ship. According to another implementation, the light emitter 20', the optical receiver 30 and the optical reflector 40 are attached to a common bracket that can more determinately maintain the components in proper optical alignment. The brackets and the means 204a and 204b by which they are attached to the hull are preferably made of non-oxidizing materials.

Figure 5A:
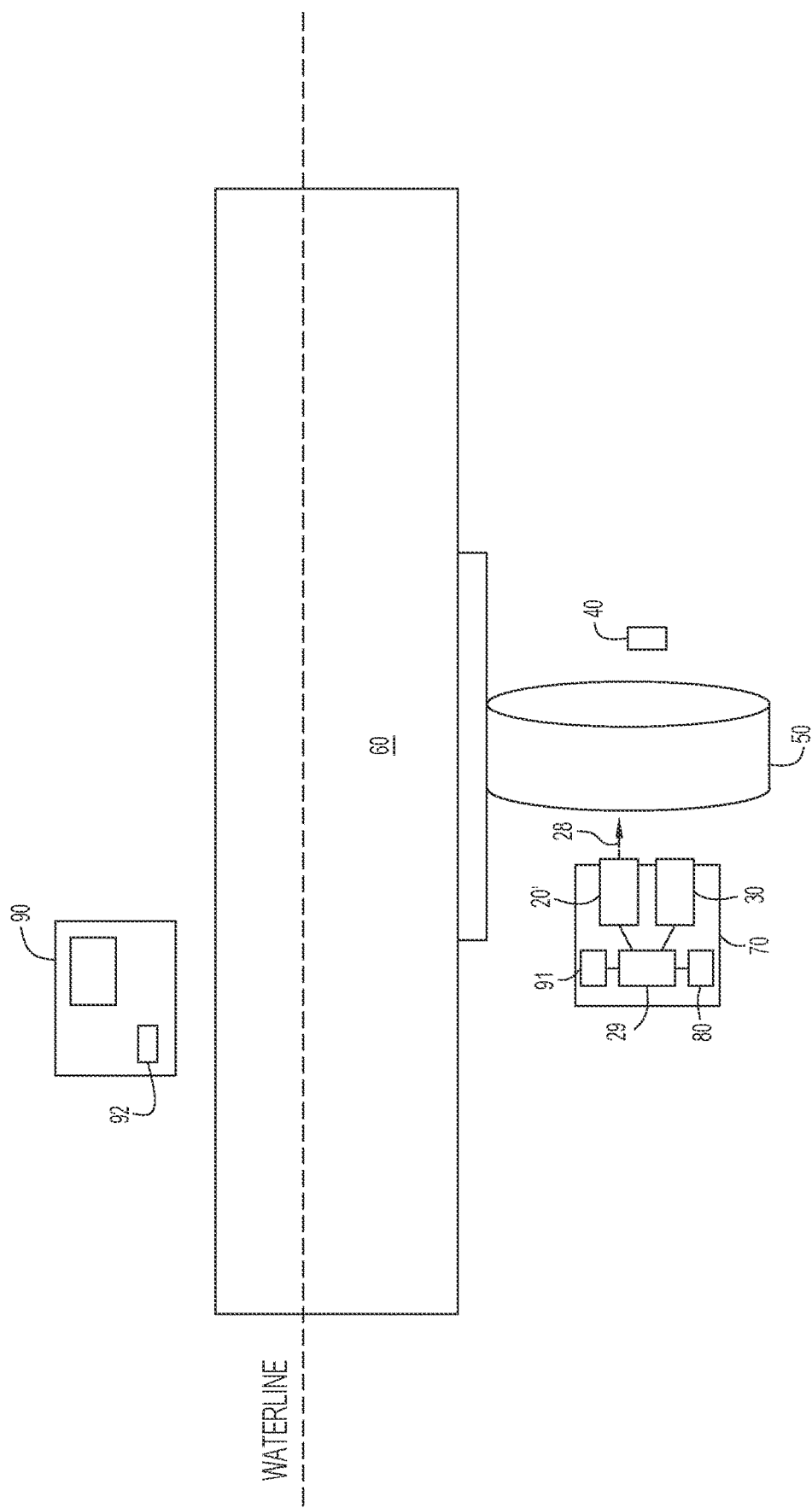

FIGS. 5A and 5B are schematic representations of a system 500 for remotely monitoring a depletion state of a sacrificial anode according to another implementation. Like system 400 discussed above, system 500 includes a light emitter 20' and an optical receiver 30 located on the first side 51 of the sacrificial anode 50. System 500 also includes an optical reflector 40 on the second side 52 of the sacrificial anode 50 that facilitates optical communication between the light emitter 20' and the optical receiver 30. The optical reflector 40 is positioned and angularly oriented to receive the light beam 28 from the light emitter 20' and to reflect the light beam onto the optical receiver 30 as shown in FIG. 4B when that portion of the sacrificial anode 50 located in the intended optical pathway of the light beam has eroded.

The light emitting end of the light emitter 20', optical receiver 30, optical reflector 40 and sacrificial anode 50 are arranged with respect to one another such that when a successful transmission of the light beam 28 onto the optical receiver 30 occurs, a determination of the amount of erosion can be at least estimated, determined or predicted. That is, a successful transmission of the light beam across the sacrificial anode indicates that a certain percentage of the sacrificial anode has eroded.

In the example of FIGS. 5A and 5B, the light emitter 20' and optical receiver 30 are controlled by a common control unit 29 and are powered by a battery 80. A salient feature of system 500 is that each of the light emitter 20', optical receiver 30, control unit 29, battery 80 are located inside a common watertight housing 70 that is intended to be positioned adjacent the sacrificial anode 50 when in use. Also located inside housing 70 is a transceiver 91 that facilitates wireless communications between the control unit 29 and a control unit 90 located inside the ship. Control unit 90 also includes a transceiver 92 that communicates with transceiver 91. The system 500 advantageously requires no hard wiring between itself and equipment inside the ship.

According to some implementations the housing 70 is supported by a first bracket 105a and the optical reflector 40 is supported by a second bracket 105b, the first and second brackets being coupled to the hull 60 of the ship. According to another implementation, the housing 70 and the optical reflector 40 are attached to a common bracket that can more determinately maintain the components in proper optical alignment. The brackets and the means 205a and 205b by which they are attached to the hull are preferably made of corrosion resistant materials.

The light emitting end of the light emitter 20', optical receiver 30, optical reflector 40 and sacrificial anode 50 are arranged with respect to one another such that when a successful transmission of the light beam 28 into or onto the optical receiver 30 occurs, a determination of the amount of erosion can be at least estimated, determined or predicted. That is, a successful transmission of the light beam across the sacrificial anode indicates that a certain percentage of the sacrificial anode has eroded.

In response to receiving the light beam 28, the optical receiver 30 is configured to produce an electrical signal that is wirelessly transmissible by transceiver 91 to the control unit 90 located inside the ship that controls an activation of an alarm or other warning means (e.g. light and/or sound indicator).

According to one implementation, the control unit 29 located inside the housing 70 regulates the delivery of power from the battery 80 to the light emitter 20' and to optical receiver 30 so that power is only intermittently delivered for the purpose of extending the life of the battery.

While the present disclosure has provided examples for explaining in some detail the certain implementations, these examples do not limit the scope of the invention. It is understood by those skilled in the art that various changes or modifications of the invention may be made therein without departing from the spirit and scope of the invention. The terms and expression which have been employed herein are used as terms of description and not of limitation, and there is no intent, in the use of such terms and expressions, of excluding any of the equivalents of the features shown and described or portions thereof.

What is claimed is:

1. A system for remotely monitoring a depletion state of a sacrificial anode, the system comprising:
    a light emitter that is configured to emit a first light beam;
    an optical receiver positioned to receive the first light beam emitted by the light emitter;
    a sacrificial anode located between the light emitter and the optical receiver in a pathway of the first light beam, the sacrificial anode being electrically coupled to a metallic structure for minimizing corrosion of the metallic structure;
    absent a presence of the sacrificial anode in the pathway of the light beam, the optical receiver is configured to receive the first light beam, and in response to receiving the first light beam, to generate an electrical signal indicative of a depletion state of the sacrificial anode.

2. The system according to claim 1, wherein the sacrificial anode includes first and second sides facing in opposite directions, a light emitting end of the light emitter being arranged facing the first side and the optical receiver being arranged facing the second side.

3. The system according to claim 2, wherein the light emitter, the optical receiver and the sacrificial anode are arranged such that upon the electrical signal being generated in the optical receiver the depletion state of the sacrificial anode is between 50% and 90%.

4. The system according to claim 1, wherein the sacrificial anode includes first and second sides facing in opposite directions, a light emitting end of the light emitter and the optical receiver being located on the first side of the sacrificial anode, the system further comprising a light reflector located on the second side of the sacrificial anode that is configured to reflect the first light beam onto the optical receiver.

5. The system according to claim 4, wherein the light emitter and optical receiver are located in a common watertight housing.

6. The system according to claim 5, further comprising a battery located inside the watertight housing that is electrically coupled to and configured to power the light emitter and the optical receiver.

7. The system according to claim 6, further comprising a control circuit located inside the watertight housing, the control circuit being configured to cause the light emitter to intermittently emit the first light beam.

8. The system according to claim 7, further comprising a transmitter located inside the watertight housing that electronically communicates the optical receiver with a remote indicator.

9. The system according to claim 8, wherein the light source is a laser diode that emits red light.

10. The system according to claim 5, wherein the housing is coupled to the metal structure by a bracket, the bracket being made of a non-oxidizing and non-electrically conductive material.

11. The system according to claim 10, wherein the bracket is attached to the structure with a non-oxidizing and non-electrically conductive fastener.

12. The system according to claim 1, further comprising a control circuit that is configured to cause the light emitter to intermittently emit the first light beam.

13. The system according to claim 12, wherein the control circuit is configured to cause the optical receiver to be powered by a battery only during a time when the first light beam is being emitted by the light emitter.

14. The system according to claim 12, wherein the control circuit is configured to cause the light emitter to emit the first light beam no less than once a week.

15. The system according to claim 1, wherein the light emitter is a laser diode that emits red light.

16. The system according to claim 1, wherein the light emitter comprises a waveguide having a first end optically coupled to a light source and a second end opposite the first end that is configured to direct the light beam out of the waveguide, the waveguide being configured to cause the first light beam to propagate from the first end to the second end.

17. The system according to claim 16, wherein the waveguide comprises an end emitting fiber optic cable.

18. The system according to claim 1, wherein the light emitter and optical receiver are respectively coupled to the structure by first and second brackets, the first and second brackets being made of a non-oxidizing and non-electrically conductive material.

19. The system according to claim 18, wherein each of the first and second brackets is attached to the structure with a non-oxidizing and non-electrically conductive fastener.

20. The system according to claim 1, wherein the light emitter is configured to emit a second beam that is capable of removing unwanted deposits at an output of the light emitter.

* * * * *